No. 772,133. PATENTED OCT. 11, 1904.
L. J. DAVIS.
RIVET OR MARKING TAG.
APPLICATION FILED FEB. 20, 1904.
NO MODEL.

Witnesses:
Ethel A. Feller
Otis A. Earl

Inventor,
Linford J. Davis
By Fred L. Chappell
Atty.

No. 772,133. Patented October 11, 1904.

UNITED STATES PATENT OFFICE.

LINFORD J. DAVIS, OF BATTLECREEK, MICHIGAN.

RIVET OR MARKING-TAG.

SPECIFICATION forming part of Letters Patent No. 772,133, dated October 11, 1904.

Application filed February 20, 1904. Serial No. 194,541. (No model.)

*To all whom it may concern:*

Be it known that I, LINFORD J. DAVIS, a citizen of the United States, residing at the city of Battlecreek, in the county of Calhoun and State of Michigan, have invented certain new and useful Improvements in Rivets or Marking-Tags, of which the following is a specification.

My invention relates to improvements in marking-tags or rivets.

My improved marking-tag or rivet is particularly adapted for use as a marking-tag for laundry, merchandise, and the like, although it is desirable for use as a securing means for bands or belts and similar articles.

The objects of this invention are, first, to provide an improved marking-tag or rivet formed of sheet metal which is light and strong and one which may be quickly attached without the aid of special tools; second, to provide an improved marking-tag or rivet formed of sheet metal which when in use is not liable to engage external objects.

Further objects and objects relating to structural details will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1:
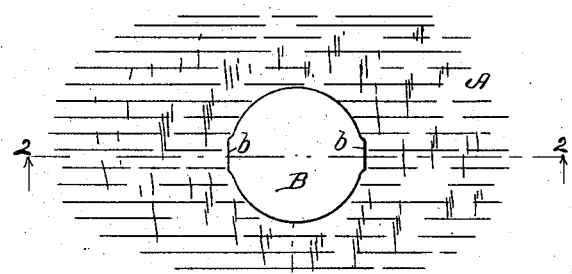
Figure 2:
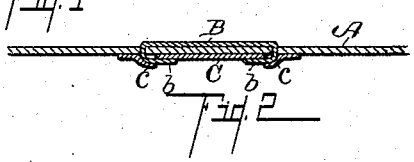
Figure 4:
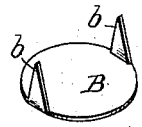
Figure 5:
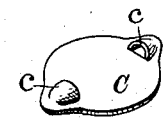
Figure 3:
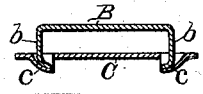
Figure 6:
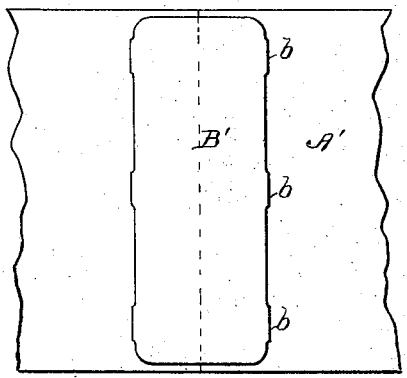
Figure 7:
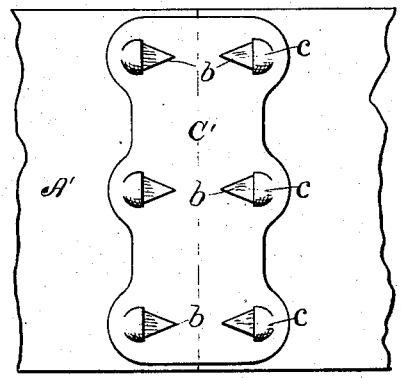

Figure 1 is a plan view of a structure embodying the features of my invention. Fig. 2 is a detail sectional view taken on a line corresponding to line 2 2 of Fig. 1 looking in the direction of the little arrows at the ends of the section-lines. Fig. 3 is a detail sectional view showing the relation of the parts in the process of securing the same together. Fig. 4 is a perspective view of the head member B in an inverted position. Fig. 5 is a perspective view of the washer member C in an inverted position. Fig. 6 is a plan view of a modification, showing my invention adapted as a securing means for bands or belts. Fig. 7 is an inverted plan view of the structure appearing in Fig. 6.

In the drawings similar letters of reference refer to similar parts throughout the several views.

Referring to the drawings, A represents the fabric to which my improved marking-tag or rivet is shown attached.

The head member B, which is formed of sheet metal, is provided with a pair of downwardly-extending prongs or pins $b$. The pins $b$ are oppositely arranged and are formed integral with the head.

C is the washer, in which oppositely-facing pockets $c$ are formed to receive and deflect the pins or prongs $b$. These pockets are formed by making cross-slits in the washer of sufficient width to receive the pin and depressing a portion of the metal adjacent to the slit.

In attaching, the prongs are placed above the pockets, when a blow with a hammer will drive them into place. They are deflected by the pockets $c$ and clamped against the under side of the washer. This also clamps the edges of the pockets upon the prongs, so that it is very difficult to withdraw them.

My improved marking-tag or rivet may be formed of very light material and still be very strong. The same is quickly applied without the aid of special tools, a hammer or any other suitable object being all that is necessary to secure the same in place. When used as a marker for laundry-tags or the like, any suitable character may be stamped in the head, or a label may be pasted thereon. When used as a marker, the same may be formed of very light material, which as the prongs are deflected or clenched by the pockets may be attached without the aid of any tools, as by simply pressing the head down upon the washer the prongs are deflected or clamped against the washer member. The pockets $c$ are oppositely arranged, so that the prongs are guided, and there is no tendency for them to bend over without passing through and clenching. When in use, the ends of the attaching-prongs are pressed tightly against the bottom of the washer member, so that there is no tendency for them to engage external objects. It will be noted that in securing the parts together the ends of the prongs are first bent inwardly, as appears in Fig. 3, which insures that they will press tightly against the outside of the washer.

In the modified construction shown in Figs. 6 and 7 three pairs of prongs are illustrated on the head B', the structure there illustrated being adapted to secure the abutting ends of the pieces A' together. The washer member C' (see Fig. 7) is provided with a corresponding number of pockets to receive the prongs. This forms a very light and durable fastening.

My improved marker-tag or rivet is very light in weight and economical to produce, the same being very quickly attached, and, as above remarked, particularly when used as a marker for laundry or merchandise or the like the same can be attached without the aid of tools. It is very secure and is neat and attractive in appearance.

Having thus described my invention, what I claim as new, and desire to secure by Letters Patent, is—

1. The combination of a head member formed of sheet metal having oppositely-arranged prongs thereon; a washer member formed of sheet metal having oppositely-facing pockets therein adapted to receive and deflect said prongs, said pockets being formed by slitting said washer and depressing the metal at one side of said slits, as specified.

2. The combination of a head member formed of sheet metal having oppositely-arranged prongs thereon; a washer member formed of sheet metal having oppositely-facing pockets therein adapted to receive and deflect said prongs, as specified.

In witness whereof I have hereunto set my hand and seal in the presence of two witnesses.

LINFORD J. DAVIS. [L. S.]

Witnesses:
L. J. KARCHER,
A. M. BIRD.